US005785152A

United States Patent [19]
Fujita et al.

[11] Patent Number: 5,785,152
[45] Date of Patent: Jul. 28, 1998

[54] LUBRICANT-CONTAINING END CAP FOR A BICYCLE CONTROL CABLE

[75] Inventors: Kouji Fujita; Satoru Koga, both of Sakai, Japan

[73] Assignee: Shimano, Inc., Osaka, Japan

[21] Appl. No.: 814,546

[22] Filed: Mar. 10, 1997

Related U.S. Application Data

[63] Continuation-in-part of Ser. No. 669,947, Jun. 25, 1996, Pat. No. 5,636,709.

[30] Foreign Application Priority Data

Oct. 15, 1996 [TW] Taiwan .................................. 85112580

[51] Int. Cl.[6] ........................................................ F16N 7/12
[52] U.S. Cl. ........................... 184/16; 184/15.1; 74/502.4; 74/502.6
[58] Field of Search ............................ 184/15.1, 15.2, 184/15.3, 16; 74/502.4, 502.6

[56] References Cited

U.S. PATENT DOCUMENTS

| | | | |
|---|---|---|---|
| 3,858,687 | 1/1975 | Masarky et al. | 184/15.1 |
| 4,066,147 | 1/1978 | Toyomoto | 184/15 |
| 4,892,005 | 1/1990 | Nagano | 74/502.4 |
| 5,443,139 | 8/1995 | Scott | 184/15.2 |
| 5,636,709 | 6/1997 | Fujita et al. | 184/16 |

FOREIGN PATENT DOCUMENTS

| | | |
|---|---|---|
| 964748 | 8/1950 | France. |
| 5-50978 | 3/1993 | Japan. |

*Primary Examiner*—Thomas E. Denion
*Attorney, Agent, or Firm*—James A. Deland

[57] ABSTRACT

An end cap for a bicycle control cable of the type wherein an inner cable slides within an outer casing includes a housing defining a hollow chamber, wherein the housing has a first end defining a first opening for receiving the inner cable therethrough and a second end defining a second opening adapted to fit to the outer casing of the bicycle control cable. A lubricant is disposed in the chamber, and a screen is provided for screening the first opening at the first end of the housing. A portion of the hollow chamber between the lubricant and the second end of the housing is open through the second end of the housing, but the lubricant has sufficiently low fluidicity at normal temperature that the lubricant does not flow out of the housing.

20 Claims, 4 Drawing Sheets

LUBRICANT-CONTAINING END CAP FOR A BICYCLE CONTROL CABLE

CROSS-REFERENCE TO RELATED APPLICATIONS

This application is a continuation-in-part of application Ser. No. 08/669,947, filed Jun. 25, 1996, now U.S. Pat. No. 5,636,709.

BACKGROUND OF THE INVENTION

The present invention is directed to end caps for bicycle control cables and, more particularly, to an end cap which can be used to lubricate exposed ends of the control cable.

A conventional bicycle control cable, such as a brake cable, a shift cable, or another such control cable, has an outer tube that is made of a resin or another material that is flexible, so it conforms to the control cable attachment seat (stopper) provided to the frame of the bicycle. Accordingly, when a control cable manufacturer produces a control cable, the end of the control cable is structured such that a metal end cap is fixed by caulking at one or both ends of the outer tube, or such that an end cap made of a rigid plastic is fixed, and the control cable is usually shipped with the end cap already assembled in place. In a case such as this, in order to reduce the friction with the outer tube or to prevent rusting of the inner cable, it is preferable to inject grease or another such lubricant into the outer tube ahead of time, that is, prior to the insertion of the inner cable into the outer tube. Not only does the work involved in injecting the lubricant into the outer tube take a great deal of time, but once the lubricant has been injected it leaks from the end cap at the other end of the outer tube (that is, the inner cable exit) as it is carried along by the inner cable passing through the outer tube, which is a problem in that the lubricant is wasted.

In light of this problem, the present applicant previously proposed in Japanese Patent Application 5-50978 a bicycle control cable of the type in which the end caps are already attached, wherein metal end caps equipped with shield members for preventing the leakage of grease from between the above-mentioned outer tube and the inner cable are fixed by caulking to both ends of the outer tube, and grease is made to be present in the inner cable insertion space between the above-mentioned shield members of the above-mentioned outer tube. With a bicycle control cable such as this, the grease is degraded very little over a relatively long period, and it does not readily leak out because of the shield members at both ends of the outer tube, and it is therefore present within the outer tube over a long term, displays its lubricating action over a long term as well, and prevents the infiltration of dirty water and moisture.

In specific terms, as shown in FIG. 8, the above-mentioned bicycle control cable (3) is designed such that at both ends of an outer tube (3b) made of resin, the ends of the outer tube (3b) are formed by metal end caps (1) fixed by caulking to the main part of the outer tube (3b), and a grease shield component (11) is formed from [I] a plurality of rubber shield members (8) that are molded in a ring shape so as to allow the insertion and sliding of an inner cable (3a) and are housed in the end cap (1) and [ii] a plurality of bushings (6) that are molded in a ring shape so as to allow the insertion and sliding of the inner cable (3a) and are housed in the end cap (1) such that they support the shield members (8) and form a grease chamber (9). Forming the grease shield component (11) at both ends of the outer tube (3b) results in a structure in which grease G is injected from one end into the inner cable insertion space between the shield component (11) at one end of the outer tube (3b) and the shield component (11) at the other end.

However, such a bicycle control cable of the pre-assembled end cap type requires a plurality of shield members (8) and a plurality of bushings (6) in order to form the grease chamber (9) within the end cap (1), which means that not only is there a greater number of parts, but the structure is also more complicated, so the production of the end cap (1) takes an extremely long time and productivity is poor. Also, since the end caps (1) are fixed by caulking to both ends of the outer tube (3b) so that they are integrated with the outer tube (3b), the grease G that is first put into the grease chamber (9) is consumed over time as the bicycle control cable (3) is used, so when the control cable becomes difficult to operate, just the end cap (1) cannot be taken off the outer tube (3b), replaced with an maintenance-use end cap, and re-used, nor can additional grease G be injected into the end cap (1) from the outside because of the presence of the shield members (8) in the end cap (1), so a drawback is that the entire bicycle control cable (3) has to be replaced. Furthermore, when such a bicycle control cable of the pre-assembled end cap type is shipped from the control cable manufacturer, it has already been manufactured to the specified length and other dimensions as ordered by the bicycle assembly manufacturer, and for a bicycle assembly manufacturer that produces small quantities of many different models, such a bicycle control cable (3) that has already been manufactured to the specified length and other dimensions is lacking in terms of adaptability.

For instance, since different models of bicycles have control cables of different length and other dimensions, a bicycle assembly manufacturer that produces small quantities of many different models will sometimes purchase a roll of outer tubing, cut this rolled outer tubing to the required length according to the model being produced, and assemble the end cap on the control cable himself, rather than using a control cable that has been pre-assembled with the end caps from the control cable manufacturer, in order to be able to respond more quickly to various changes and to demand. Here again, when a control cable is thus assembled, it is similarly desirable to inject grease or another such lubricant into the outer tube ahead of time, that is, before the inner cable is passed through the outer tube, in order to prevent the rusting of the inner cable and to reduce friction with the outer tube. However, not only is the work involved in this lubricant injection extremely time-consuming, but, as mentioned above, the grease that has been injected leaks from the end cap at the other end of the outer tube (that is, from the inner cable exit) as it is carried along by the inner cable passing through the outer tube, which is a problem in that the lubricant is wasted.

Also, since the sealing performance of the end caps is poor with a control cable that has been thus assembled, after the control cable has been attached to the control cable attachment seats provided to the bicycle, the lubricant that was injected into the outer tube gradually leaks from the end cap at the end of the outer tube as the inner cable is moved in and out in the course of the use of the control cable, and this leakage dirties the bicycle and also decreased the lubrication of the outer tube and the inner cable.

SUMMARY OF THE INVENTION

The present invention is directed to an end cap which can be easily attached in a removable manner to the end of an outer tube of a control cable, which requires no time-consuming lubrication injection work even when the control cable is custom made, will provide the same level of sealing performance as a pre-assembled bicycle control cable, will lubricate the cable for a long time, and will prevent the infiltration of mud or water.

In one embodiment of the present invention, an end cap for a bicycle control cable of the type wherein an inner cable slides within an outer casing includes a housing defining a hollow chamber, wherein the housing has a first end defining a first opening for receiving the inner cable therethrough and a second end defining a second opening adapted to fit to the outer casing of the bicycle control cable. A lubricant is disposed in the chamber, and a screen is provided for screening the first opening at the first end of the housing. A portion of the hollow chamber between the lubricant and the second end of the housing is open through the second end of the housing, but the lubricant has sufficiently low fluidicity at normal temperature that the lubricant does not flow out of the housing. If desired, the screen may completely cover the first opening to prevent the lubricant from flowing out of the first opening, or else the screen may have an opening and a waxy substance may be placed between the lubricant and the screen opening to prevent the lubricant from flowing out of the first opening. The housing also may include a smaller diameter nose section extending from the first opening for attachment to other segments of the control cable system.

DETAILED DESCRIPTION OF THE EMBODIMENTS

Figure 1:
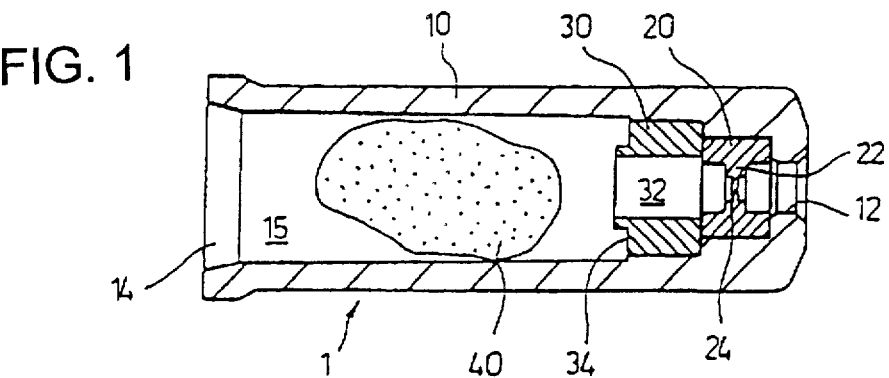
FIG. 1 is a cross sectional diagram of a particular embodiment of a lubricant-containing end cap according to the invention for use with a bicycle control cable.

FIG. 1 is a cross sectional diagram of a particular embodiment of a lubricant-containing end cap according to the invention for use with a bicycle control cable. In this embodiment, 1 is a normal type of end cap. This end cap 1 is mounted to both ends of the resin outer tube 60 of a bicycle control cable, such as a bicycle brake cable or a shift cable, and forms the end portions of the outer tube 60. The housing 10 of the end cap 1 has a roughly hollow cylindrical shape, and the inside diameter thereof is roughly the same as, or slightly larger than, the outside diameter of the outer tube 60. A first opening 12 that is smaller than the inside diameter of the housing 10 is formed on the front end side (the right side in the figures) of the housing 10, and a second opening 14 whose inside diameter is roughly the same as the inside diameter of the housing 10 is formed on the rear end side (the left side in the figures) of the housing 10.

A shield ring 20 that has a roughly I-shaped cross section is provided coaxially with the first opening 12 and adjacent to the back side of the first opening 12. A center hole 22 whose diameter is roughly the same as the outside diameter of the inner cable 70 discussed below is formed in the center of this shield ring 20, and a thin film 24 that completely seals the center hole 22 is formed ahead of time at approximately the center position of this center hole 22. A ring-form base plate 30 is provided coaxially with and adjacent to the shield ring 20. This base plate 30 is provided in order to receive and fix the distal end portion 62 of the outer tube 60 when the end cap 1 is mounted onto the end of the outer tube 60, and a center hole 32 is formed in the center portion of this base plate 30 as well. The space between the second opening 14 and the base plate 30 in the interior of the housing 10 creates a lubricant chamber 15, and a lubricant 40 that has low fluidity at normal temperature, which is used for such purposes as lubricating and rustproofing the inner cable 70 discussed below, is injected from the second opening 14, which completes the end cap 1 of this practical example. When the various environmental conditions and handling methods encountered in the shipping and delivery of the finished product are taken into account, the lubricant 40 injected into the lubricant chamber 15 of the end cap 1 should be a lubricant such as a grease that has low fluidity at normal temperature so that the lubricant 40 will not flow out of the second opening 14 when the end cap 1 is placed in a standing state such that the first opening 12 and second opening 14 thereof are above and below, respectively. In this embodiment, lubricant 40 is a grease that will not flow out from the end cap 1 at 80° C. or lower.

Next, the process of assembling a bicycle control cable using the end cap 1 will be described with reference to FIGS. 2a through 2e.

Figure 2A:
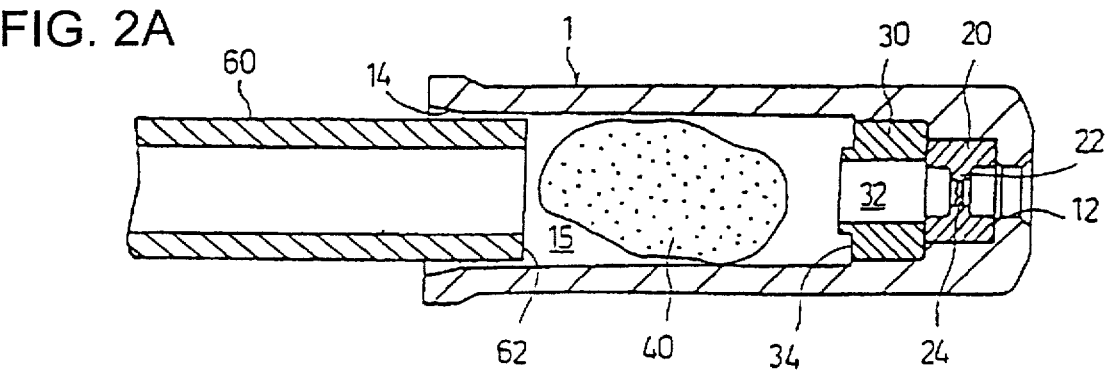
FIGS. 2A–2E are cross sectional views of the end cap shown in FIG. 1 illustrating how the end cap is assembled into a complete bicycle control cable system.

FIG. 2a shows the state directly before the mounting of the end cap 1 on the outer tube 60. Here, the distal end portion 62 of the outer tube 60 is about to be inserted into the lubricant chamber 15 from the second opening of the end cap 1.

Figure 2B:
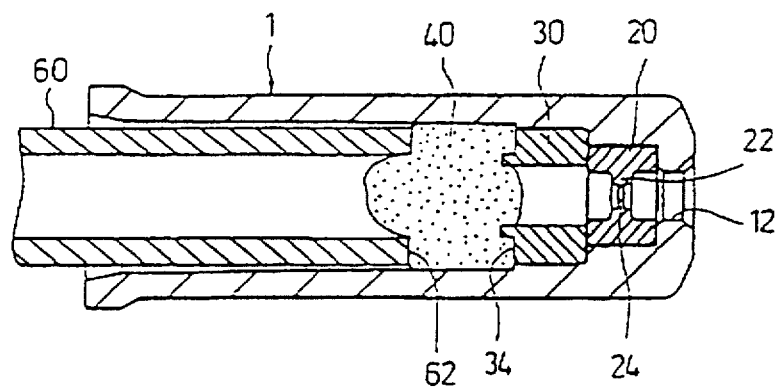

FIG. 2b shows the state midway through the mounting of the end cap 1 on the outer tube 60. Here, the lubricant 40 that was injected into the lubricant chamber 15 is moved toward the base plate 30 by the pressing force produced by the distal end portion 62 of the outer tube 60, part of the lubricant 40 goes into the interior of the outer tube 60, and part of the lubricant 40 begins to go into the center hole 32 of the base plate 30.

Figure 2C:
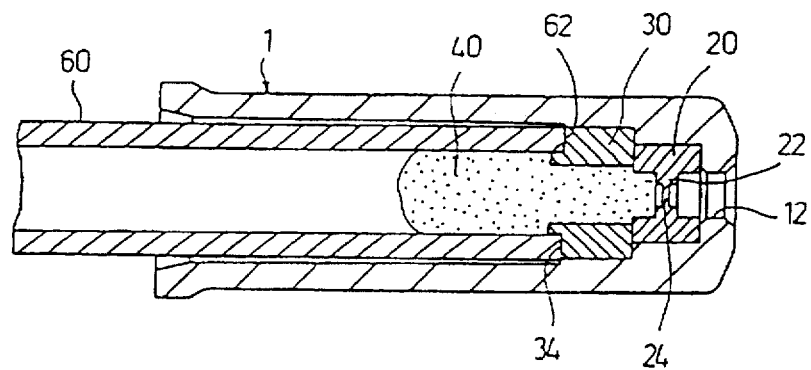

FIG. 2c shows the state when the end cap 1 has been completely mounted on the outer tube 60. Specifically, the distal end portion 62 of the outer tube 60 is in close contact with the contact surface 34 of the base plate 30 opposite the distal end portion 62. Here, the lubricant 40 is moved further toward the base plate 30 by the pressing force produced by the distal end portion 62 of the outer tube 60, part of the lubricant 40 goes into the interior of the outer tube 60, and the rest of the lubricant 40 fills all of the space from the center hole 32 in the base plate 30 to the center hole 22 in the shield ring 20, but the movement of the lubricant 40 is blocked by the film 24 since the film 24 has been provided ahead of time to the center hole 22 in the shield ring, so further movement to the first opening 12 side of the end cap 1 is impossible. In other words, the role of the film 24 provided to the center hole 22 in the shield ring 20 is to prevent the lubricant 40 from leaking from the center hole 22 in the shield ring 20 into the first opening 12 of the end cap 1 when the end cap 1 is mounted on the outer tube 60.

Figure 2D:
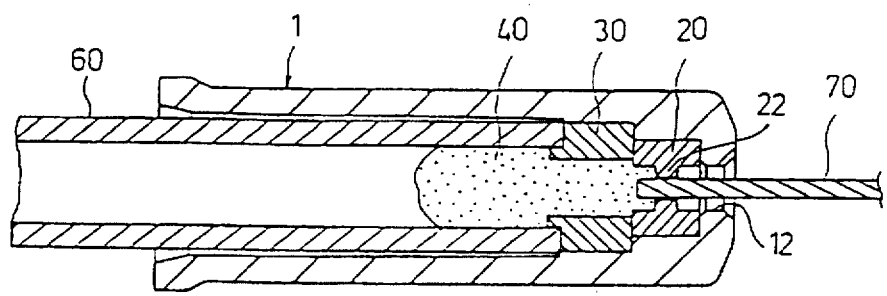

FIG. 2d shows the state midway through the insertion of the inner cable 70 through the outer tube 60. Specifically, when the inner cable 70 is inserted from the first opening 12 of the end cap 1 into the interior of the end cap 1 in the state shown in FIG. 2c, the film 24 over the center hole 22 in the shield ring 20 is broken, and the distal end portion of the inner cable 70 begins to go into the lubricant 40.

Figure 2E:
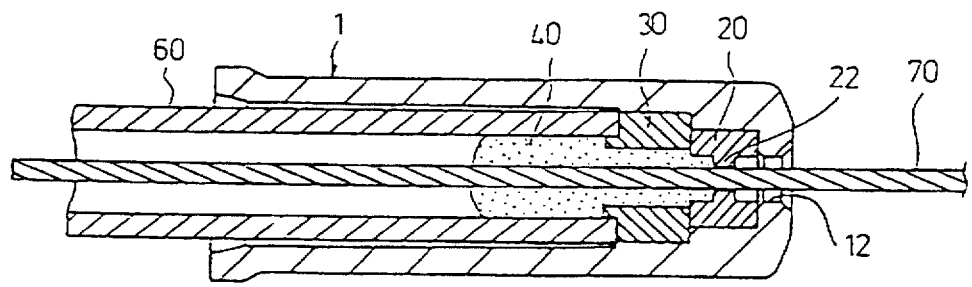

FIG. 2e shows the state when the inner cable 70 has been inserted through the outer tube 60. Specifically, when the inner cable 70 is inserted further into the outer tube 60, the inner cable 70 goes through the lubricant 40, so the surface of the inserted inner cable 70 is covered with the lubricant 40.

When a bicycle control cable is assembled in this manner, all that has to be done is to insert the outer tube 60 in the end cap 1, then pass the inner cable 70 through the inside of the outer tube 60 from the first opening 12 of the end cap 1. There is no special need for the end cap 1 to be fixed by caulking to the outer tube 60, as in the past. Nevertheless, this simple operation results in a bicycle control cable having an end cap 1 that allows leakage of the lubricant 40 to be prevented and the rustproofing effect and lubrication action of the inner cable 70 to be displayed over a long term, and it prevents the infiltration of dirty water and moisture. Also, since the only structural parts of the end cap are the housing 10, one shield member 20, and one base plate 30, into which the lubricant 40 is injected, the construction is extremely simple, and it is possible to attach the end cap 1 easily and in a removable fashion to the end of the outer tube 60 of a bicycle control cable, so it can be utilized as a maintenance part, and when the lubrication effect provided by the lubricant 40 has decreased, the end cap 1 can be simply replaced and re-used, so there is no need to replace the whole bicycle cable. Furthermore, if the housing 10 is made from a transparent material, the amount of injected lubricant 40 remaining inside the housing can be visually checked from the outside, so it can be easily ascertained when the end cap 1 should be replaced.

Figure 3:
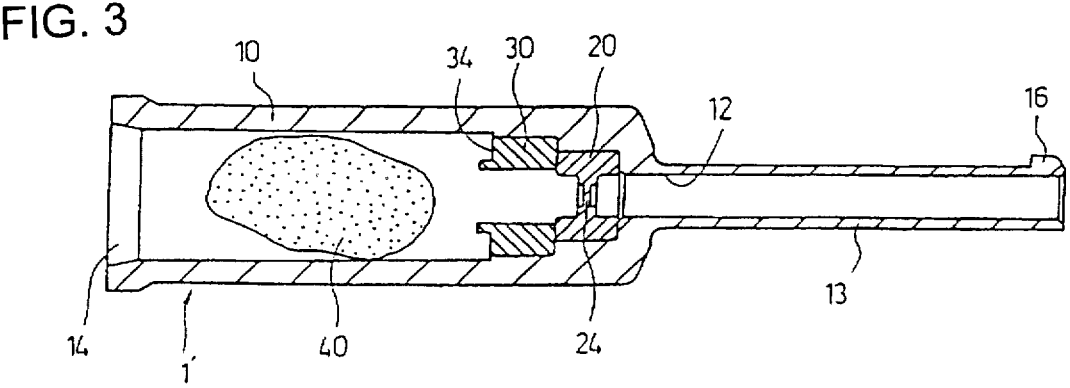
FIG. 3 is a cross sectional diagram of an alternative embodiment of a lubricant-containing end cap according to the invention for use with a bicycle control cable.

FIG. 3 is a cross sectional diagram of an alternative embodiment of a lubricant-containing end cap according to the invention for use with a bicycle control cable. The end cap in this embodiment is a nose type of end cap 1' as opposed to the normal type of end cap shown in FIG. 1. However, to simplify the description, only those features that are different from the embodiment shown in FIG. 1 will be described. Components that are the same as the embodiment shown in FIG. 1 are labeled with the same symbols.

As shown in FIG. 3, the difference between this embodiment and the embodiment shown in FIG. 1 is the shape of the housing 10. In this embodiment, the housing 10 of end cap 1' is formed such that it has a large-diameter main section 11 with a roughly hollow cylindrical shape and a pipe-form small-diameter nose section 13 that extends coaxially from the outer side of the first opening 12 in the large-diameter main section 11 to the outside. This results in a nose type of end cap 1'. In addition, a protrusion 16 that is used to reinforce the linking with a rubber boot may be provided around the outer periphery on the distal end side of the nose section 13.

Figure 4:
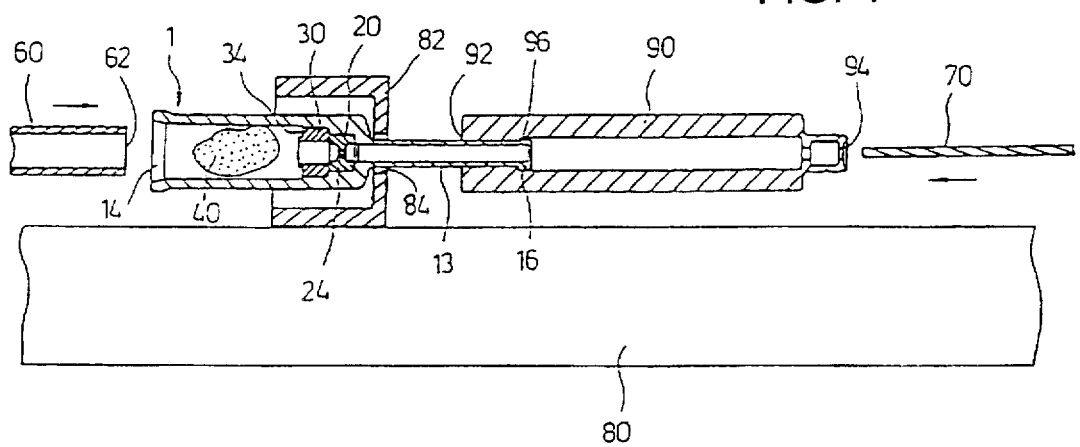
FIG. 4 is a cross sectional view of the end cap shown in FIG. 3 illustrating how the end cap is assembled into a complete bicycle control cable system.

FIG. 4 is a cross section of the relation by which the nose type of end cap 1' is combined with the other members of the control cable system. In FIG. 4, 80 is the frame of the bicycle, 82 is a control cable attachment seat (stopper) that is provided to the surface of the frame 80 and that is used to attach the bicycle control cable, and 84 is a center hole in the control cable attachment seat 82. 90 is a rubber boot that is used at the boundary portion between the inner cable 70 and the nose type of end cap 1' midway along the path of the bicycle control cable. 92 is a linking opening in the rubber boot 90 that is used to link to the nose section 13 of the end cap 1', and 94 is an inner cable insertion opening in the rubber boot 90.

When a bicycle control cable is produced by assembling the outer tube 60, the nose type of end cap 1', the rubber boot 90, and the inner cable 70, as shown in FIG. 4, the first step is the insertion of the outer tube 60 into the second opening 14 in the end cap 1' until the distal portion 62 thereof hits the contact surface 34 of the base plate 30, just as in the embodiment shown in FIG. 1 above. Next, the nose section 13 of the nose type of end cap 1' is passed through the center hole 84 in the control cable attachment seat 82 and is inserted through the linking opening 92 of the rubber boot 90 to link it with the rubber boot 90. Since a protrusion 16 is formed around the outer periphery of the distal end side of the nose section 13 of the nose type of end cap 1', if the nose section 13 is inserted into the interior of the rubber boot 90 until this protrusion 16 engages with a step 96 formed in the interior of the rubber boot 90, then the protrusion 16 and the step 96 will be engaged together, so the nose type of end cap 1' can be kept firmly linked to the rubber boot 90. In this state, the inner cable 70 is inserted into the interior of the rubber boot 90 from the inner cable insertion opening in the rubber boot 90 and further goes through the nose section 13, after which it passes through the outer tube 60 in the same manner as in the embodiment shown in FIG. 1 above, which completes the bicycle control cable.

With this nose type of end cap 1', in addition to the same merits being obtained as with the normal type of end cap 1 in the embodiment shown in FIG. 1, since there is a pipe-form small-diameter nose section 13 that extends coaxially from the outer side of the first opening 12 in the large-diameter main section 11 to the outside, the inner cable 70 that has been passed through the end cap 1' is kept in a state of coaxiality with the shield member 20 of the end cap 1' at all times, and the shield member 20 is more resistant to damage, so the shielding performance can be maintained over a longer period of time than with the end cap 1 in the embodiment shown in FIG. 1.

Figure 5:
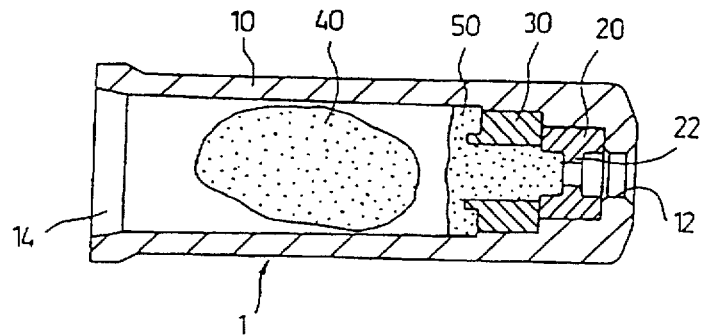
FIG. 5 is a cross sectional diagram of another alternative embodiment of a lubricant-containing end cap according to the invention for use with a bicycle control cable.

FIG. 5 is a cross sectional diagram of another alternative embodiment of a lubricant-containing end cap according to the invention for use with a bicycle control cable. To simplify the description, only those points that are different from the embodiment shown in FIG. 1 will be described. Components that are the same as in that embodiment are labeled with the same symbols.

The difference between this embodiment and the embodiment shown in FIG. 1 is that no film is formed over the center hole 22 of the shield ring 20 in order to prevent the leakage of the lubricant 40 from this center hole 22 to the first opening 12. Instead, a waxy substance 50 is packed ahead of time into the center hole 32 of the base plate 30 and on both sides (front and back) of the center hole 32. Just as with the lubricant 40 injected into the lubricant chamber 15, this waxy substance 50 can be a wax that will not flow out from the end cap 1 at 80° C. or lower. In addition to the same merits being obtained as with the end cap in the embodiment shown in FIG. 1, the end cap 1 of this embodiment also has the merit of enhancing the lubrication of the inner cable 70 at normal temperature through the presence of the wax.

Figure 6:
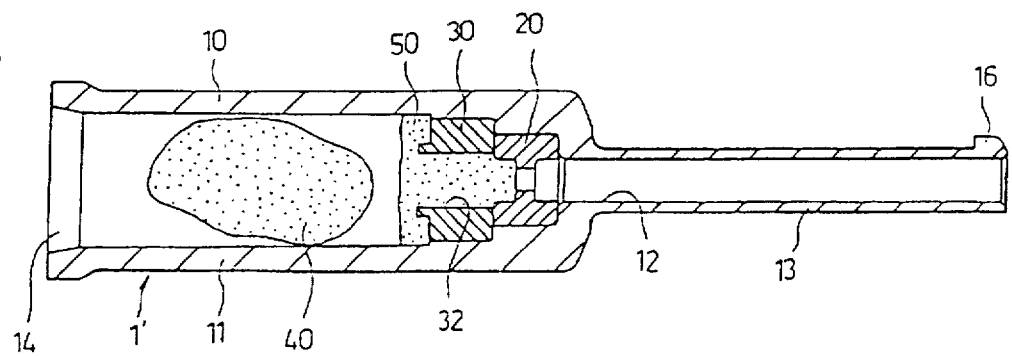
FIG. 6 is a cross sectional diagram of another alternative embodiment of a lubricant-containing end cap according to the invention for use with a bicycle control cable.

FIG. 6 is a cross sectional diagram of another alternative embodiment of a lubricant-containing end cap according to the invention for use with a bicycle control cable. The end cap 1' in this embodiment is also a nose type of end cap 1', just as in the embodiment shown in FIG. 3, so to simplify the description, only those points that are different from that embodiment will be described. Components that are the same as in the embodiment shown in FIG. 3 are labeled with the same symbols.

As shown in FIG. 6, the difference between this embodiment and the embodiment shown in FIG. 3 is that no film is formed over the center hole 22 of the shield ring 20 in order to prevent the leakage of the lubricant 40 from this center hole 22 to the first opening 12. Instead, a waxy substance 50 is packed ahead of time into the center hole 32 of the base plate 30 and on both sides (front and back) of the center hole 32. Just as with the lubricant 40 injected into the lubricant chamber 15, this waxy substance 50 can be a wax that will not flow out from the end cap 1' at 80° C. or lower. In addition to the same merits being obtained as with the end cap 1' in the embodiment shown in FIG. 3, the end cap 1' of this embodiment also has the merit of enhancing the lubrication of the inner cable 70 at normal temperature through the presence of the wax.

Figure 7:
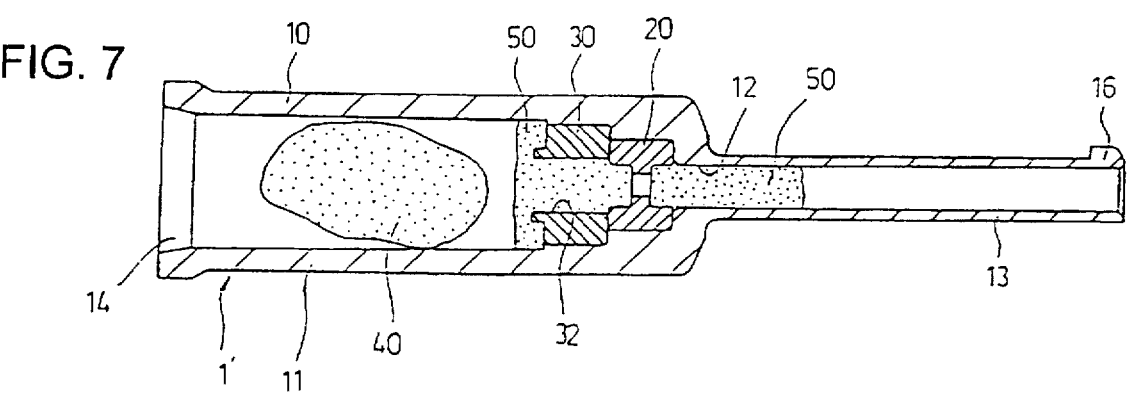
FIG. 7 is a cross sectional diagram of another alternative embodiment of a lubricant-containing end cap according to the invention for use with a bicycle control cable.
Figure 8:
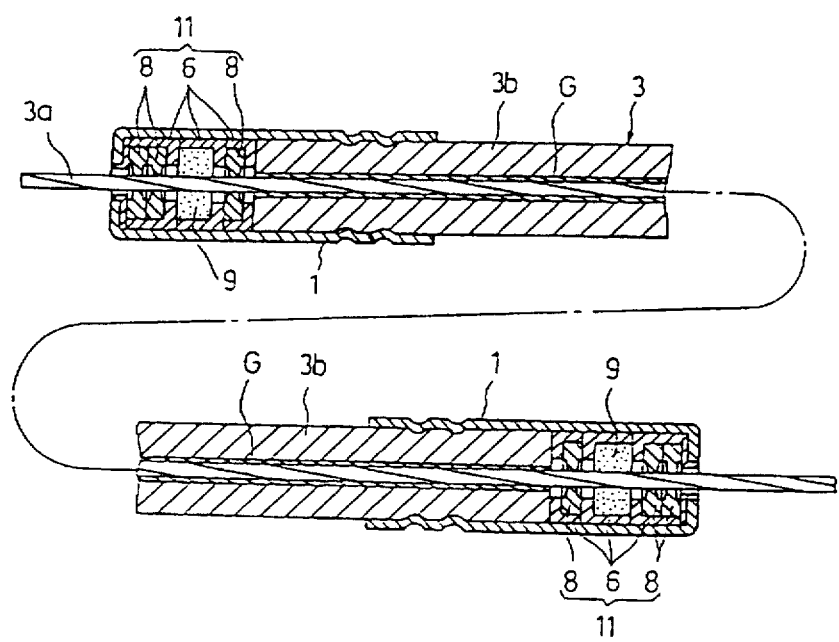
FIG. 8 is a cross sectional diagram of a prior art end cap for a bicycle control cable.

FIG. 7 is a cross sectional diagram of another alternative embodiment of a lubricant-containing end cap according to the invention for use with a bicycle control cable. The end cap 1' of this embodiment also is a nose type of end cap 1', just as in the embodiment shown in FIG. 6, so to simplify the description, only those points that are different from that embodiment will be described. Components that are the same as in the embodiment shown in FIG. 6 are labeled with the same symbols.

As shown in FIG. 7, the difference between this embodiment and the embodiment shown in FIG. 6 is that whereas the end cap 1' in FIG. 6 merely had the waxy substance 50 packed into the center hole 32 of the base plate 30 and on both sides (front and back) of the center hole 32, with the end cap 1' of this embodiment the waxy substance 50 is further packed into the first opening 12 as well. As a result, in addition to the same merits being obtained as in the embodiment shown in FIG. 6, the end cap 1' of this embodiment also has the merit of further enhancing the lubrication of the inner cable 70 at normal temperature through the presence of the wax.

While the above is a description of various embodiments of the present invention, further modifications may be employed without departing from the spirit and scope of the present invention. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. An end cap for a bicycle control cable of the type wherein an inner cable (70) slide within an outer casing (60) comprising:

a housing (10) defining a hollow chamber (15), the housing (10) having a first end defining a first opening (12) for receiving the inner cable (70) therethrough and a second end defining a second opening (14) adapted to fit to the outer casing (60) of the bicycle control cable;

a lubricant (40) disposed in the chamber (15);

a screen (20,30) screening the first opening (12) at the first end of the housing (10);

wherein the hollow chamber (15) is open through the second end of the housing (10) so that the lubricant (40) is exposed through the second end of the housing (10); and wherein the lubricant (40) does not flow out of the housing (10) at 80° C. or lower.

2. The end cap according to claim 1 wherein the screen (20) completely covers the first opening (12).

3. The end cap according to claim 1 wherein the screen (20,30) comprises a ring-shaped shield member (20,30) positioned coaxially with the first opening (12).

4. The end cap according to claim 3 wherein the ring-shaped shield member (20) includes a centrally disposed film (24) for completely covering the first opening (12) and preventing the lubricant from flowing out of the housing (10) through the first opening (12).

5. The end cap according to claim 4 further comprising a ring-shaped base plate (30) disposed adjacent to and coaxially with the ring-shaped shield member (20) for receiving an end of the outer casing (60) of the control cable.

6. The end cap according to claim 1 wherein at least a portion of the housing (10) is transparent for viewing the lubricant (40).

7. The end cap according to claim 1 wherein the housing (10) further comprises a larger diameter main section (11) disposed at the second end of the housing and a smaller diameter nose section (13) disposed at the first end of the housing and extending coaxially with the first opening (12).

8. The end cap according to claim 7 wherein the screen (20) completely covers the first opening (12).

9. The end cap according to claim 7 wherein the screen (20,30) comprises a ring-shaped shield member (20,30) positioned coaxially with the first opening (12).

10. The end cap according to claim 9 wherein the ring-shaped shield member (20) includes a centrally disposed film (24) for completely covering the opening (12) and preventing the lubricant from flowing out of the housing (10) through the first opening (12).

11. The end cap according to claim 10 further comprising a ring-shaped base plate (30) disposed adjacent to and coaxially with the ring-shaped shield member (20) for receiving an end of the outer casing (60) of the control cable.

12. The end cap according to claim 7 wherein at least a portion of the housing (10) is transparent for viewing the lubricant (40).

13. An end cap for a bicycle control cable of the type wherein an inner cable (70) slides within an outer casing (60) comprising:

a housing (10) defining a hollow chamber (15), the housing (10) having a first end defining a first opening (12) for receiving the inner cable (70) therethrough and a second end defining a second opening (14) adapted to fit to the outer casing (60) of the bicycle control cable;

a lubricant (40) disposed in the chamber (15);

a screen (20,30) screening the first opening (12) at the first end of the housing (10);

wherein a portion of the hollow chamber (15) between the lubricant (40) and the second end of the housing (10) is open through the second end of the housing (10); and wherein the screen (20,30) defines a screen opening therethrough, and further comprising a waxy substance (50) disposed between the lubricant (40) and the first opening (12) for preventing the lubricant from flowing out of the first opening (12).

14. The end cap according to claim 13 wherein the waxy substance (50) does not flow out of the first opening (12) at 80° C. or lower.

15. The end cap according to claim 13 wherein the waxy substance (50) is disposed on opposite sides of the screen (20,30).

16. An end cap for a bicycle control cable of the type wherein an inner cable (70) slides within an outer casing (60) comprising:

a housing (10) defining a hollow chamber (15), the housing (10) having a first end defining a first opening (12) for receiving the inner cable (70) therethrough and a second end defining a second opening (14) adapted to fit to the outer casing (60) of the bicycle control cable;

a lubricant (40) disposed in the chamber (15);

a screen (20.30) screening the first opening (12) at the first end of the housing (10);

wherein a portion of the hollow chamber (15) between the lubricant (40) and the second end of the housing (10) is open through the second end of the housing (10);

wherein the housing (10) further comprises a larger diameter main section (11) disposed at the second end of the housing and a smaller diameter nose section (13) disposed at the first end of the housing and extending coaxially with the first opening (12); and wherein the screen (20.30) defines a screen opening therethrough, and further comprising a waxy substance (50) disposed between the lubricant (40) and the first opening (12) for preventing the lubricant from flowing out of the first opening (12).

17. The end cap according to claim 16 wherein the waxy substance (50) does not flow out of the first opening (12) at 80° C. or lower.

18. The end cap according to claim 16 wherein the waxy substance (50) is disposed on opposite sides of the screen (20,30).

19. An end cap for a bicycle control cable of the type wherein an inner cable (70) slides within an outer casing (60) comprising:

a housing (10) defining a hollow chamber (15), the housing (10) having a first end defining a first opening (12) for receiving the inner cable (70) therethrough and a second end defining a second opening (14) adapted to fit to the outer casing (60) of the bicycle control cable;

a lubricant (40) disposed in the chamber (15);

a screen (20.30) screening the first opening (12) at the first end of the housing (10);

wherein a portion of the hollow chamber (15) between the lubricant (40) and the second end of the housing (10) is open through the second end of the housing (10);

wherein the housing (10) further comprises a larger diameter main section (11) disposed at the second end of the housing and a smaller diameter nose section (13) disposed at the first end of the housing and extending coaxially with the first opening (12); and a protrusion (16) extending radially outwardly from a free end of the nose section (13).

20. An end cap for a bicycle control cable of the type wherein an inner cable (70) slides within an outer casing (60), wherein the end cap consists of:

a housing (10) defining a hollow chamber (15), the housing (10) having a first end defining a first opening (12) for receiving the inner cable (70) therethrough and a second end defining a second opening (14) adapted to fit to the outer casing (60) of the bicycle control cable;

a lubricant (40) disposed in the chamber (15);

a ring-shaped shield member (20) screening the first opening (12);

a ring-shaped base plate (30) disposed adjacent to and coaxially with the ring-shaped shield member (20) for receiving an end of the outer casing (60) of the control cable;

wherein the hollow chamber (15) is open through the second end of the housing (10) so that the lubricant (40) is exposed through the second end of the housing (10); and wherein the lubricant (40) does not flow out of the housing (10) at 80° C. or lower.

* * * * *